(12) United States Patent
Li et al.

(10) Patent No.: US 7,156,965 B1
(45) Date of Patent: Jan. 2, 2007

(54) SCANNING ELECTROCHEMICAL POTENTIAL MICROSCOPE

(75) Inventors: Chunzeng Li, Santa Barbara, CA (US); Kevin J. Kjoller, Santa Barbara, CA (US)

(73) Assignee: Veeco Instruments Inc., Woodbury, NY (US)

( * ) Notice: Subject to any disclaimer, the term of this patent is extended or adjusted under 35 U.S.C. 154(b) by 274 days.

(21) Appl. No.: 10/052,921

(22) Filed: Nov. 9, 2001

(51) Int. Cl.
*G01N 27/416* (2006.01)
(52) U.S. Cl. .................. 204/400; 204/412; 205/790.5
(58) Field of Classification Search ................ 204/400, 204/406, 412; 205/790.5; 250/306, 307; 73/105
See application file for complete search history.

(56) References Cited

U.S. PATENT DOCUMENTS

| | | | |
|---|---|---|---|
| 4,668,865 A | 5/1987 | Gimzewski et al. |
| 4,871,938 A | 10/1989 | Elings et al. |
| 4,939,363 A | 7/1990 | Bando et al. |
| 5,202,004 A | 4/1993 | Kwak et al. |
| 5,497,000 A | 3/1996 | Tao et al. |
| 5,742,172 A | 4/1998 | Yasutake |
| 5,750,989 A | 5/1998 | Lindsay et al. |
| 6,005,246 A | 12/1999 | Kitamura et al. |
| 6,073,485 A | 6/2000 | Kitamura |
| 6,245,204 B1 | 6/2001 | Lindsay et al. |

OTHER PUBLICATIONS

Horrocks et al, J. Chem. Soc., Faraday Trans., 1998, 94(8), pp. 1115-1118.*
Wei et al, Anal. Chem.,Apr. 1995, 67(8), pp. 1346-1356.*
Gyurcsanyi et al, Anal. Chem., May 2001, 73(9), pp. 2104-2111.*
Denuault et al, Scanning Electrochemical Microscopy, 2001, pp. 397-444.*
Wipf et al (J. Electrochem. Soc. vol. 138, 1991, pp. 469-474).*

* cited by examiner

*Primary Examiner*—Kaj K. Olsen
(74) *Attorney, Agent, or Firm*—Boyle Fredrickson Newholm Stein & Gratz S.C.

(57) ABSTRACT

An apparatus and method of determining a potential at a surface of a sample in a polar liquid, for example, across an electrical double layer, includes the step of immersing the sample in a polar solution to form a potential gradient at the surface. A tip of a scanning probe microscope probe is then positioned in the solution generally adjacent the surface. During operation, the method includes measuring a potential of the probe. Relative scanning movement between the sample and the probe may be provided, and, in one mode of operation, a feedback signal is generated based on the measured potential. In that case, the tip may be moved generally orthogonal to the surface in response to the feedback signal to maintain a generally constant separation therebetween. The polar solution may have an associated ionic concentration, and the ionic concentration can be modified to tune the operation of the SEPM.

16 Claims, 18 Drawing Sheets

SCANNING ELECTROCHEMICAL POTENTIAL MICROSCOPE

BACKGROUND OF THE INVENTION

1. Field of the Invention

The present invention is directed to scanning probe microscopes, and more particularly, a scanning electrochemical potential microscope (SEPM) for characterizing a sample placed in a liquid by measuring an electrochemical potential that varies across an electrical double layer at the liquid/solid interface.

2. Description of Related Art

Scanning probe microscopes (SPMs), such as the atomic force microscope (AFM), are devices which typically use a sharp tip and low forces to characterize the surface of a sample down to atomic dimensions. Generally, SPMs include a probe having a tip that is introduced to a surface of a sample to detect changes in the characteristics of a sample. By providing relative scanning movement between the tip and the sample, surface characteristic data can be acquired over a particular region of the sample and a corresponding map of the sample can be generated.

In an AFM, for example, in a mode of operation called contact mode, the microscope typically scans the tip, while keeping the force of the tip on the surface of the sample generally constant. This is accomplished by moving either the sample or the probe assembly up and down relatively perpendicularly to the surface of the sample in response to a deflection of the cantilever of the probe assembly as it is scanned across the surface. In this way, the data associated with this vertical motion can be stored and then used to construct an image of the sample surface corresponding to the sample characteristic being measured, e.g., surface topography. Similarly, in another preferred mode of AFM operation, known as TappingMode™ (TappingMode™ is a trademark owned by the present assignee), the tip is oscillated at or near a resonant frequency of the associated cantilever of the probe. The amplitude or phase of this oscillation is kept constant during scanning using feedback signals, which are generated in response to tip-sample interaction. As in contact mode, these feedback signals are then collected, stored and used as data to characterize the sample. Note that "SPM" and the acronyms for the specific types of SPMs, may be used herein to refer to either the microscope apparatus, or the associated technique, e.g., "atomic force microscopy."

Another type of SPM is the scanning tunneling microscope (STM) a portion of which is shown in an exploded view in FIG. 1A for a tip-sample separation "S." In an STM 10, similar to AFM, a probe 12 having a tip 14 is employed to scan a surface 19 of a sample 18. However, in STM, tip 14 is conducting. In addition, tip 14 is positioned an atomic distance, such as two to three atoms (i.e., approximately ten angstroms), above a surface 19 of sample 18. To reduce the area exposed to liquid, and thus the faraday (parasitic) current, an insulating layer 16 may be disposed on tip 14 so as to leave only the apex of the tip exposed to the liquid. Notably, when working in air, the insulating layer 16 is not required. And, because device operation is based on current flow between the probe tip and sample surface, the sample is typically a conductor or semiconductor.

In operation, a current, known as the tunneling current, is made to flow between sample 18 and the free end or apex of tip 14. This tunneling current is produced in response to a bias voltage applied between the sample 18 and tip 14 and is sensitive to the tip-sample separation distance "S." In particular, for example, the current may increase by about a factor of ten in response to a one atom (approximately 2–3 angstroms) decrease in separation distance.

In an STM, the tip is typically fast scanned over the surface of the sample while the vertical position of the tip is monitored via the measured amount of current and, in response, feedback signals are generated to maintain the tip-sample separation generally constant. The tip is preferably coupled to a piezoelectric device that responds to positive and negative voltages generated based on the feedback signals to expand or contract, and thereby lower or raise the tip/sample relative to the other of the tip/sample. In sum, during operation, maintaining a constant tunneling current through the use of the feedback loop thereby gives a generally constant separation of the tip above the surface. Similar to AFM, these feedback signals are indicative of a particular characteristic of the sample.

In yet another type of SPM, similar to STM, a scanning electrochemical microscope (SECM) utilizes a technique in which a current flows through a small electrode tip near a conductive, semiconductive or insulating sample immersed in a solution, as shown and described in commonly owned U.S. Pat. No. 5,202,004. SECM can be used to characterize processes and structural features of the sample surface as a tip is scanned near the surface. In general, SECM can provide surface topography information and analytical data at greater tip-sample separations. Further, since SECM operation is based on electrochemical reactions, microfabrication can be carried out with this apparatus. For example, etching and deposition of metals and semi-conductors and synthesis (for example, electropolymerization) are possible.

As shown in FIG. 1B, an SECM 20 includes a tip 22 having an insulative coating 26 that leaves exposed an uncoated apex 24 of tip 22 to facilitate electrochemical reactions during operation, as described below. Notably, the ultimate resolution of the SECM depends primarily upon the tip size and shape. In addition, the solution resistance and mass and charge transfer process rates that effect the current density distribution are also important performance factors.

While SECM apparatus resembles the STM, there are fundamental differences between the two in both principle of operation and range of applications. In SECM, again as shown in FIG. 1B, the current is carried by reduction-oxidation (hereinafter "redox") processes at the free end 24 of tip 22 and sample 18, and is controlled by electron transfer kinetics at the interfaces and mass transfer processes in solution. As a result, SECM 20 can make measurements at large tip-sample spacings (for example, in the range of 1 nanometer to 10 μm).

To the contrary, because STM depends on the flow of a tunneling current between the tip and sample, the distance between the two typically must be on the order of 1 nanometer or less, as noted above, and surface topographic x-y resolution of this size scale is usual. In addition, even for STM applications in solution, the tunneling current is non-faradaic (i.e., no chemical changes in solution components or sample surface species occur due to the tunneling current), so that unlike SECM, the tip current cannot be related directly to the sample potential.

On the other hand, the tip 12 used by STM 10 is sharp, thus allowing measurements to be made with high resolution. Again, in SECM, to facilitate the aforementioned redox processes, tip 22, and more particularly free end or apex 24 is more blunt than STM tip 14, which correspondingly compromises SECM imaging resolution.

In addition to the above, both STM and SECM have other significant drawbacks for electrochemical applications. In electrochemical STM, the highly concentrated solution compromises image resolution by interfering with the tunneling current. Moreover, for biological applications, because the tip-substrate separation is extremely small (less than 1 nanometer, as mentioned above), if the biological object is relatively large, the tip may penetrate into the object being scanned, thus clearly compromising the integrity of the image. This is exacerbated by the fact that biological molecules are poor conductors, thus providing no relief with respect to the narrow tip-sample separations. For example, if one places a DNA molecule on top of a conducting substrate and tries to perform STM to characterize the DNA molecule, it will be extremely difficult to generate sufficient current to pass through the molecule. Thus, some sample measurements are impossible with an STM. Further, even if the sample is an adequate conductor, the STM is limited by the fact that, because it does not operate based on force feedback, the user is often unaware of how much force the STM tip is exerting on the sample, thus leading to damaged samples.

When employing SECM, as mentioned previously, the preferred working distance is much greater to accommodate the electrochemical reaction. In any event, however, the working distance "S" (FIG. 1B) is preferably at least 100 nm to achieve adequate performance. Larger tip-sample working distances yield very poor resolution and thus, in essence, the preferred SECM working distance is too great. A typical SECM has a working distance range that may extend hundreds of micrometers. This is primarily due to the fact that the tip must be rather large (compared to, for example, an STM tip), so as to achieve the necessary redox effects. Again, compared to STM tip 14 shown in FIG. 1A, the SECM tip 24 shown in FIG. 1B is relatively dull and resolution is correspondingly compromised.

Moreover, with further reference to SECM, the system is performing local chemistry via the electrochemical reaction. Although this aspect of the system affords SECM the ability to perform a wide range of applications such as etching, etc., a major drawback in this regard is that it is difficult to maintain reliable operability of the electrodes for extended periods of time.

In an alternative to SECM and STM, measurements across an electrical double layer that exists near the surface of a sample immersed in a liquid can be made. Generally, when the sample is placed in an ionic solution, the solution has ions which align along the sample surface. Moreover, the charged surface is characterized by a degree of ordering of the ions some distance away from the sample surface. If the sample surface is negatively charged, a layer of positive ions in the liquid align along the sample surface, then a layer of negative ions in the liquid generally align on top of the positive ions, and so forth, for a particular distance from the sample surface.

The electrical double layer phenomenon has been known and analyzed. One known system includes disposing a quartz ball on the end of a cantilever, and then applying an electrostatic force on the ball to measure sample variations in the double layer. Clearly such a system operates on a macroscopic scale. The quartz ball is several microns in diameter, and thus the resolution is correspondingly poor, and certainly insufficient for the applications contemplated by the present invention. Another known system using a method called scanning vibrating electrode technique (SVET) measures and maps the electric fields to characterize localized electrochemical activities. A differential electrometer is employed in conjunction with a lock-in amplifier to perform a.c. detection so as to improve sensitivity. This system, for example, could be used to measure localized corrosion events. However, the spatial resolution is only about a few tens of micrometers, again unacceptable for the presently contemplated applications.

Using the above types of metrology tools, a number of different applications in which electrochemistry is desirably monitored include electroplating in integrated circuit fabrication. In particular, it is desirable to monitor the crystallization of the plating because crystallization is indicative of the integrity of the plating, including conducting characteristics, etc., as appreciated by those skilled in the art. Another application of particular interest is characterizing DNA, for example, the hybridization of DNA (e.g., to detect specific sequences of DNA), as well as other biological processes.

One method of DNA characterization, is to employ what is known as a gene chip comprising an array of known DNA molecules, and introducing the chip to a prepared sample. The sample is prepared by "tagging" the individual unknown DNA molecules with fluorescent dyes. When the sample is introduced to the gene chip, if the DNA hybridizes, the DNA can be identified using an optical microscope to determine which of the known DNA molecules was "tagged."

This indirect measurement of DNA hybridization, although time efficient once the sample is prepared, is an expensive and very labor intensive process primarily due to the aforementioned sample preparation. Moreover, requiring an optical microscope has significant disadvantages, such as non-ideal resolution. In particular, each pixel on the gene chip has to be large enough to be seen by the optical microscope so it must be, typically, many microns wide.

Notably, the actual implementation of this method must include facilitating a reaction called polymerized chain reaction (PCR) to amplify the DNA. In this way, a small amount of DNA can make millions of copies of itself that can be fluorescently labeled. As a result, unfortunately, single molecules of DNA cannot readily be measured and imaged with the gene chip. In addition to this drawback, using the PCR technique is impossible for some types of samples. For example, there is no equivalent reaction to PCR for proteins. To detect some small amount of a protein, there is, as a result, a much smaller detection window.

In sum, in both SECM and STM, a significant drawback is that each system requires current flow between the tip and sample, as SECM uses electrochemical current and STM uses tunneling current as their respective feedback signal. As a result, the metrology field was in need of a system capable of monitoring electrochemical changes using a scanning probe microscope on an atomic scale, and without requiring continuous current flow. In addition, and among other applications, an apparatus capable of imaging single biological molecules, preferably without requiring extensive preparation of the sample was also needed.

SUMMARY OF THE INVENTION

The preferred embodiment overcomes the drawbacks of prior art systems by providing a scanning electrochemical potential microscope that uses a passive probe to characterize a sample surface at high resolution. The sample surface is immersed in a solution that is either low or high concentration, is capable of operating at rest and at reactive potentials, and is capable of imaging poorly conductive samples on either conducting or semi-conducting surfaces. More particularly, the system allows measurement of the potential profile across the electrical double layer existing at the polar solution/solid interface, so as to map the electrochemical potential distribution over the sample surface.

According to a first aspect of the preferred embodiment, a method of determining a potential across an electrical double layer at a surface of a sample includes the step of immersing the sample in a polar solution so as to form a potential gradient at the surface. Thereafter, a tip of a probe of a scanning probe microscope is positioned in the solution generally adjacent the surface. Then, the method includes measuring a potential of the probe.

According to another aspect of the preferred embodiment, the method further includes the step of providing relative scanning movement between the sample and the probe. The method may also include the step of generating a feedback signal based on the potential. Then, the tip is moved generally orthogonal to the surface in response to the feedback signal so as to maintain a generally constant separation between the two.

In another aspect of this embodiment, the method includes the step of recording an X-Y scan position associated with the feedback signal so as to facilitate generation of a topography map of the surface of the sample.

According to a still further aspect of the preferred embodiment, the method may include moving the tip substantially perpendicularly to the surface, and then measuring the potential difference between the tip and the sample during the moving step. Notably, the moving step is performed at a particular X-Y position of the surface of the sample.

According to an alternate aspect of the preferred embodiment, a method of characterizing a sample surface includes the step of determining, with a probe of a scanning probe microscope operating in an SEPM mode, a potential across a double layer at the sample surface. Thereafter, the method includes the step of characterizing the sample with the probe of the scanning probe microscope operating in an STM mode.

In yet another aspect of this preferred embodiment, the method further includes the step of scanning the sample surface with the probe. Then, the method includes repeating the determining and characterizing steps for a plurality of points on the sample during the scanning step. And, the method also includes generating an SEPM image based on the determining step, generating a standard SPM image based on the characterizing step, and comparing the SEPM and SPM image to determine a charge distribution associated with the sample. Notably, the comparing step preferably includes subtracting the STM image from the SEPM image so as to generate a charge distribution image.

According to another aspect of the preferred embodiment, a scanning electrochemical potential microscope (SEPM) includes a sample support that accommodates a sample immersed in a polar solution, wherein an electrical double layer is formed at a surface of the sample. The SEPM also includes a probe having a tip including a distal end disposed in the electrical double layer. Further, the SEPM includes a potential measuring device electrically coupled to the tip to measure a potential across the electrical double layer.

In another aspect of the preferred embodiment, the SEPM further includes a scanning actuator that provides relative scanning movement between the probe and the sample. In one mode of operation, a feedback circuit that generates a feedback signal based on the potential, while a Z-actuator translates the Z-position of the tip in response to the feedback signal.

Notably, the polar solution has an associated ionic concentration, and the ionic concentration can be modified to tune the operation of the SEPM. Moreover, the SEPM may include a tuning device that modifies a sample potential at the sample surface to correspondingly modify the associated working curve of the SEPM.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENT

Figure 1A:
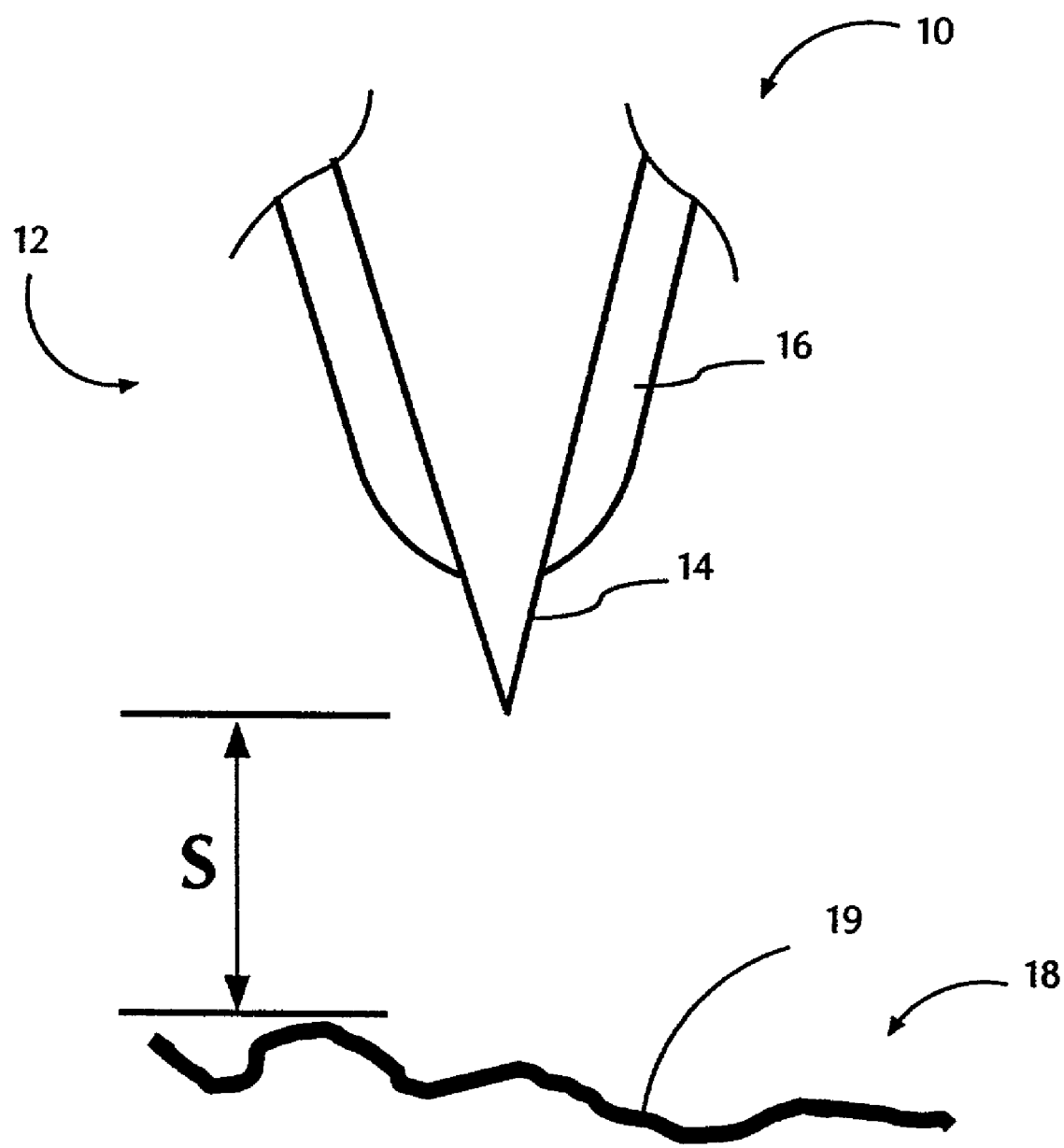
FIG. 1A is a schematic front elevational view of a prior art scanning tunneling microscope (STM)
Figure 1B:
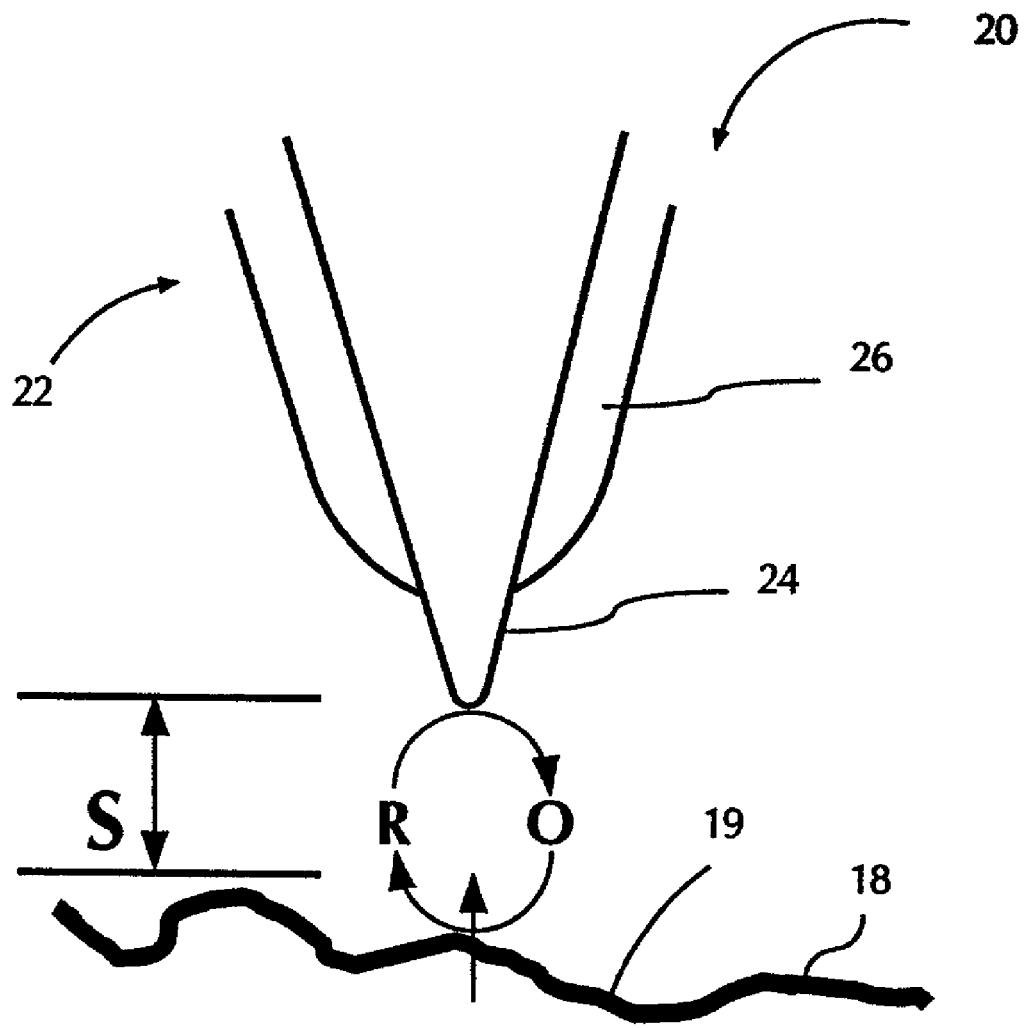
FIG. 1B is a schematic front elevational view of a prior art scanning electrochemical microscope (SECM)
Figure 2:
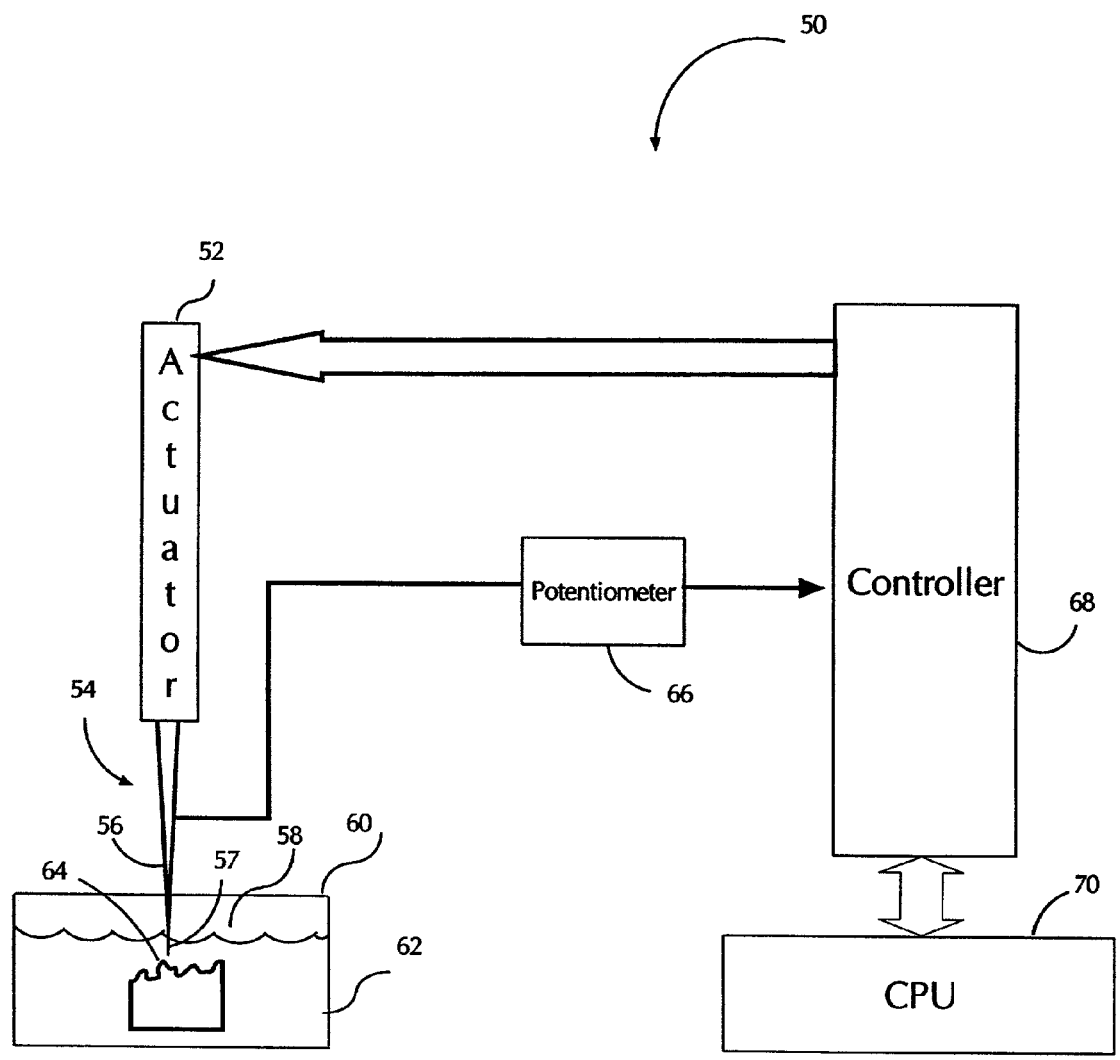
FIG. 2 is a schematic diagram illustrating a scanning electrochemical potential microscope (SEPM), according to a first embodiment.
Figure 3:
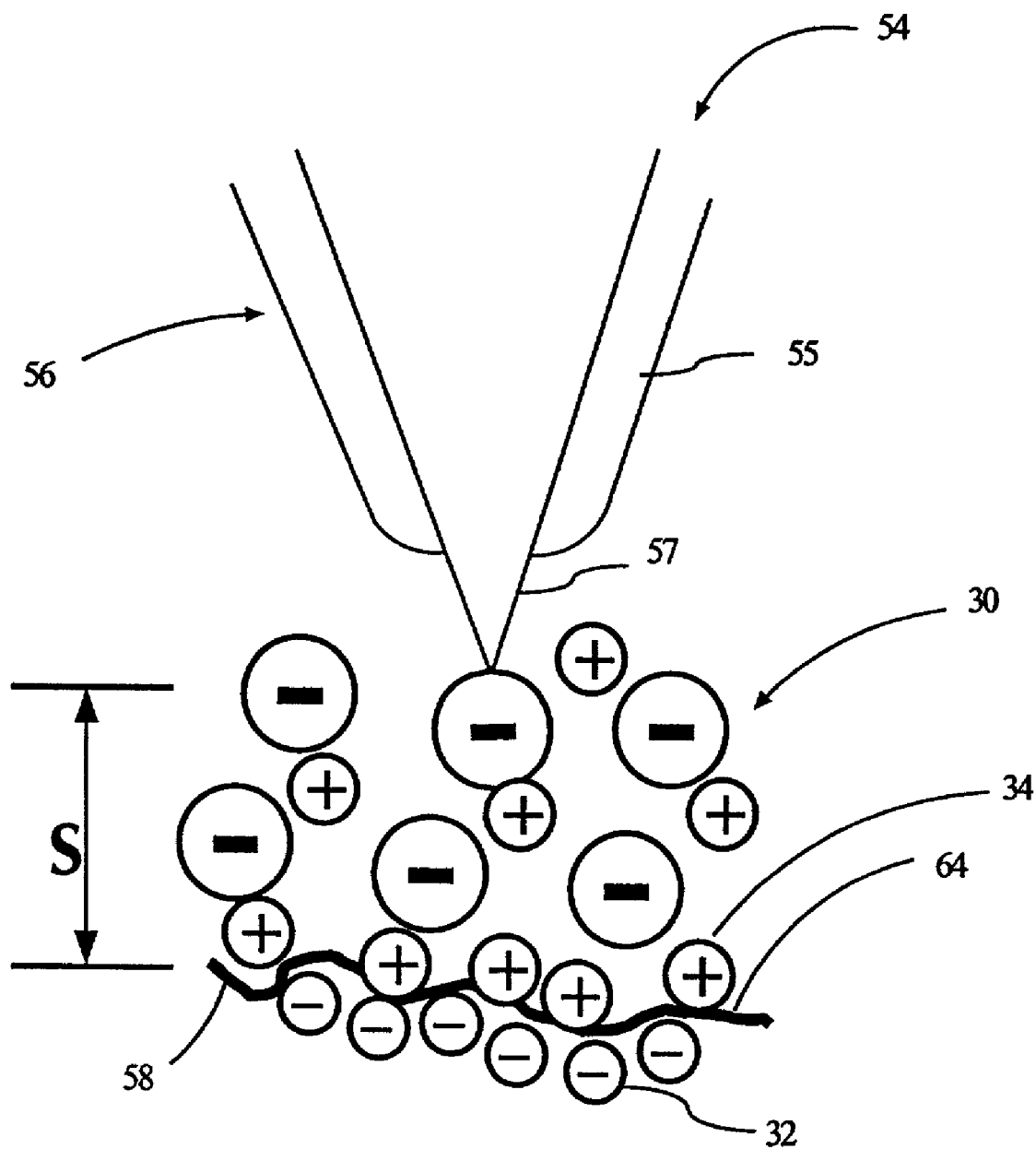
FIG. 3 is a schematic front elevational view illustrating an SEPM probe disposed in an electrical double layer formed at a sample surface immersed in an ionic solution.

Turning initially to FIG. 2, a scanning electrochemical potential microscope 50 (SEPM) according to the present invention is used to measure sample characteristics by monitoring an electrical double layer at the sample surface. An illustration of the double layer, including a cross-section of a tip 56 of a probe 54 and a substrate 58 in a scanning electrochemical potential microscope environment is shown in FIG. 3. A key property of the electrical double layer is that, as mentioned previously, the positive and negative ions or molecular dipoles of the layer are ordered in a way that follows the surface in a highly localized way. More generally, SEPM 50 monitors local changes (down to the atomic level) in the double layer that are indicative of sample characteristics.

To create the electrical double layer, in FIG. 3 for a blown up view, the substrate 58 is disposed in a polar solution such that the double layer is formed adjacent thereto. Separation "S" denotes the perpendicular distance between potential probing tip 56 and substrate 58. Notably, this separation is defined by the operating curve of the SEPM and can be tuned according to imaging requirements, as described below. An insulating coating 55 disposed on tip 56 assures that only the distal end 57 of the tip 56 is exposed to the solution, and thus only the potential near by the tip end or apex is measured, thereby facilitating optimum resolution.

Referring again to FIG. 2, SEPM 50 includes a piezoelectric actuator 52 that provides three-dimensional movement of working probe 54 including tip 56 that is used to scan a sample 58 disposed on a sample support 60. Note that although actuator 52 in FIG. 2 is preferably a three-dimensional scanner for translating the working probe 54 coupled thereto, alternatively, the sample can be scanned in three dimensions, the X, Y and Z directions as tip 56 interacts with sample surface 64. In either case, the actuator is preferably implemented with a piezotube configured to provide relative probe/sample scanning movement and translate working probe 54 or sample 58 orthogonally to the other of the probe and sample.

Sample support 60 is configured to accommodate a fluid bath 62 that facilitates the formation of the electrical double layer at a surface 64 of sample 58. In this regard, fluid bath 62 is preferably an ionic bath comprising an electrolyte. However, SEPM 50 works in any polar solution capable of forming a potential gradient extending some distance above sample surface 64, such as nanopure water. Notably, the molecules of nanopure water form di-pole moments that align to produce a double layer effect at the sample surface corresponding to variations in surface characteristics, such as topography and surface charge.

SEPM 50 also includes a potentiometer 66 coupled to working probe 54 and, more preferably, tip 56 of working probe 54, to monitor the potential of the tip as the tip scans sample 58. By scanning tip 56 relative to substrate 58 and simultaneously measuring the potential with potentiometer 66, SEPM 50 can map the topography of the surface or the potential distribution over the surface.

Figure 10A:
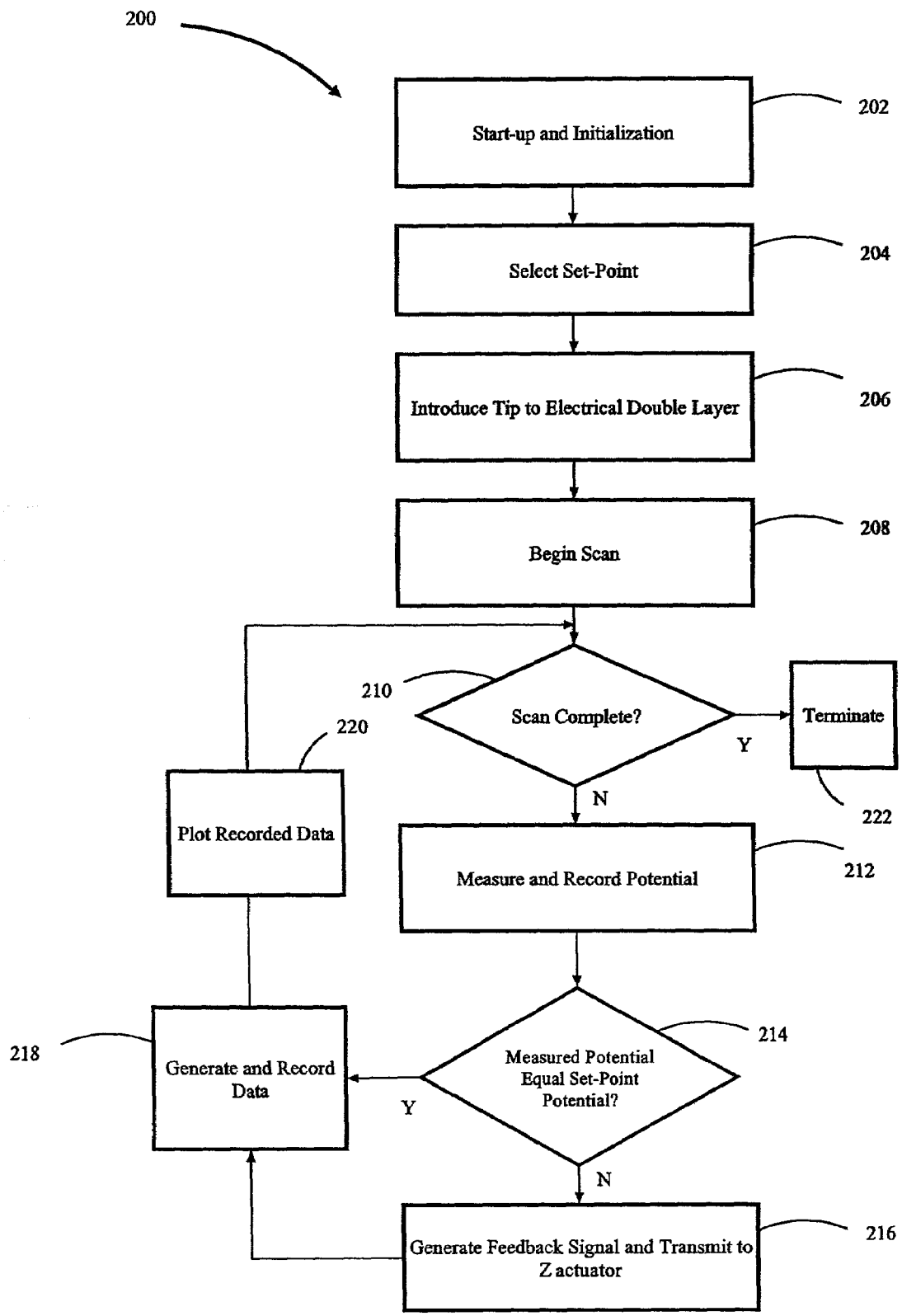
FIGS. 10A–10C illustrate flow charts corresponding to three different modes of SEPM operation.

More particularly, in operation, potentiometer 66 monitors tip voltage and in response generates an output signal corresponding to the potential across the electrical double layer, as described previously. Then, potentiometer 66 transmits the output signal to a controller 68. Depending on the mode of SEPM operation (described below in conjunction with FIGS. 10A–10C), controller 68 may utilize feedback circuitry that generates appropriate feedback signals based on the measured potentials for controlling a piezoelectric actuator 52, which translates working probe 54 in the vertical direction. Note that controller 68 is an analog or digital controller, or an analog/digital hybrid, such as the Nanoscope III® or IV® sold by Digital Instruments of Santa Barbara, Calif., a division of Veeco Instruments L.L.C.

Feedback controller 68 is coupled to a computer 70 that receives and stores data corresponding to, for example, the feedback signals generated during scanning, data that is indicative of particular characteristics of sample 58. Computer 70 uses this data, which is correlated with the scan position of the tip to generate a surface characterization map of the sample.

With further reference to FIG. 2, SEPM 50 is configured for open circuit operation where the potential difference between tip 56 and surface 64 of sample 58 (i.e., across the double layer) is measured with potentiometer 66. In other words, in this case, the sample is at a potential determined by the solution and the sample.

As noted, it is desired to be able to tune the operating point of the SEPM to provide optimum performance based on imaging parameters, e.g., type of sample. As described in further detail below in conjunction with FIG. 5, the operating point of SEPM 50 can be modified by altering the ionic concentration of fluid bath 62. Notably, the operating curve can also be modified by altering the sample potential. This latter feature is described below in conjunction with the alternate embodiment shown in FIG. 4 (SEPM 80) which, unlike SEPM 50, the sample potential can be controlled. Note, SEPM 80 covers all functionalities of SEPM 50, e.g., allowing open circuit condition by simply disconnecting counter electrode 86.

The working range and sensitivity of the SEPM of the preferred embodiment is dependent on the properties of the double layer. Generally, the double layer exhibits ordering of the ions over a greater thickness above the sample surface when the sample potential is increased, thus allowing the SEPM 80 (FIG. 4) to operate at larger tip-sample separations. However, operating at larger tip-sample separations often comes at the expense of poor imaging resolution. With respect to ionic concentration, the higher ion concentration of polar solution 62, the more sensitive the device. Nevertheless, higher ion concentration can lead to a "thinner" double layer due to a "shielding" effect caused by the ions themselves. As a result, sensitivity and resolution can be optimized, but tip-sample separations must be kept relatively narrow. This tuning of SEPMs 50 and 80 is described in further detail in conjunction with the working curves shown in FIG. 5.

Figure 4:
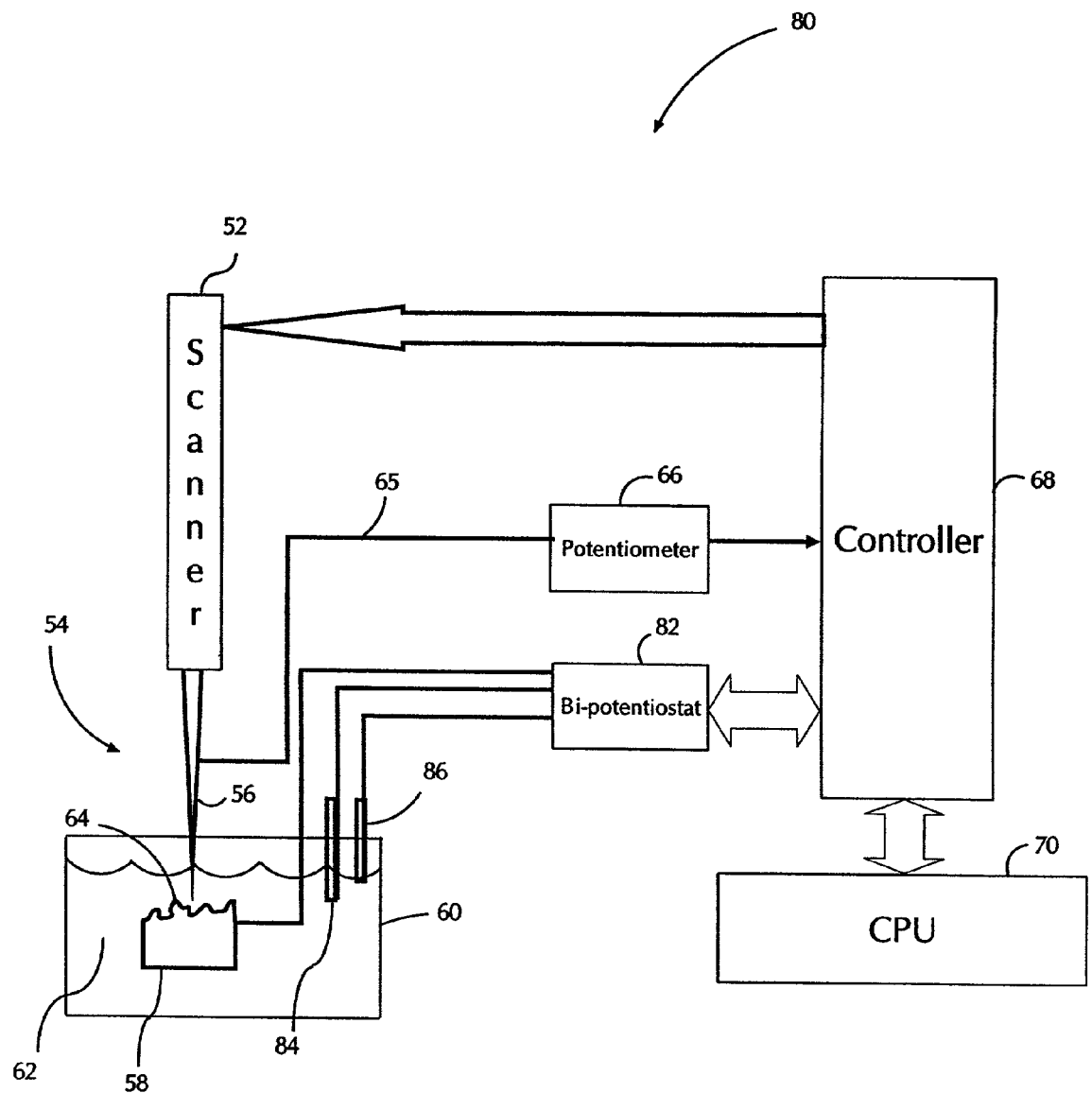
FIG. 4 is a schematic diagram illustrating an SEPM according to an alternate embodiment.

Turning to FIG. 4, an SEPM system 80 that can be tuned for optimum SEPM operation based on particular imaging parameters is shown. Similar to the embodiment shown in FIG. 2, an actuator 52 is employed to translate a sharp tip 56 of a probe 54 over a surface 64 of a sample 58 to measure the potential across an electrical double layer that exists at the surface of a sample immersed in a fluid bath 62. Moreover, a potentiometer 66 is electrically coupled to probe 54, and more preferably to tip 56 of probe 54 to monitor variations in the potential of the tip during data acquisition. Unlike SEPM 50, however, SEPM 80 is configured to provide greater control over its associated working curve to accommodate, for example, characterizing a greater range of types of samples. More particularly, unlike SEPM 50 shown in FIG. 2, which can be tuned only by modifying the ionic concentration of bath 62, the operating point of SEPM system 80 can also be modified by altering the potential at the sample surface 64.

In SEPM 80, by controlling the voltage of sample 58, the double layer can be tuned to optimize SEPM imaging performance based on, for example, desired image resolution. SEPM 80 includes a potentiostat 82 to apply and control a potential associated with the sample, and thus alter the electrical double layer. Potentiostat 82 preferably comprises a standard three-electrode configuration, where the sample 58 is the working electrode, while second and third electrodes, also known as the reference and counter electrodes, 84 and 86, respectively, each have a free end that resides in fluid bath 62. In operation, potentiostat 82 applies a voltage to sample 58 such that a desired potential difference between sample 58 and reference electrode 84 is reached. Potentiostat 82 then communicates with controller 68 to maintain that desired potential.

Again, at greater tip-sample separations, as mentioned previously, the double layer gets less and less ordered, thus making it more difficult to detect surface charge, and thus compromising the ability of the SEPM to monitor variations in, for example, orientation of the atoms of the sample. Again, at smaller tip-sample separations, better resolution is achieved but interaction between the tip and certain types of samples, such as biological samples, can damage the sample. These factors must be considered when selecting a particular sample potential to be applied by potentiostat 82. In general, as the sample potential is changed, the thickness of the double layer can increase (depending on, for example, the type of sample and solution), and thus the working range is defined by larger tip-sample separations.

In addition to controlling sample potential, as noted previously, SEPM 80 (or SEPM 50) can be tuned according to the users requirements by changing the ion concentration of the fluid bath 62. More particularly, by changing the ion concentration of fluid bath 62, the double layer formed at the surface of the sample is modified. For example, as the ionic concentration is increased, the SEPM of the preferred embodiment is more sensitive, and thus typically achieves higher resolution. However, a more concentrated fluid bath typically causes the thickness of the double layer to become smaller. Again, as described above, this is due to the fact that when more ions are present in the solution, those ions shield the bulk charge on the sample surface, thus limiting the distance the double layer extends above the sample surface. Conversely, decreasing the ion concentration of solution 62, for example, by using nanopure water, increases the thickness of the double layer due to a smaller shielding effect. As a result, sample characterization at larger tip-sample separations is possible, thus facilitating more ready imaging of delicate samples such as biological samples, albeit at typically lower resolution. Generally, by altering the ionic concentration of solution 62, the double layer can be tuned to extend a few nanometers above the surface of the sample up to hundreds of nanometers.

In sum, whether using SEPM 50 or SEPM 80, narrower tip-sample separations typically allow greater resolution, an especially important feature for many of the applications contemplated by the present invention, including point imaging down to the molecular level. However, when imaging certain samples, such as biological samples, interaction between the sharp tip of the SEPM and the sample can damage the sample. In such cases, therefore, a sufficiently large distance between tip 56 and sample 58 must be maintained to avoid collateral problems and compromised image data. Notably, SEPM 80 and SEPM 50 are capable of optimizing this tip-sample separation, and thus image resolution, for a wide range of imaging applications. Again, for SEPM 80, this is achieved by selectively defining the working range of SEPM 80 by controlling two variables, sample voltage and ion concentration of the polar solution 62.

Figure 5:
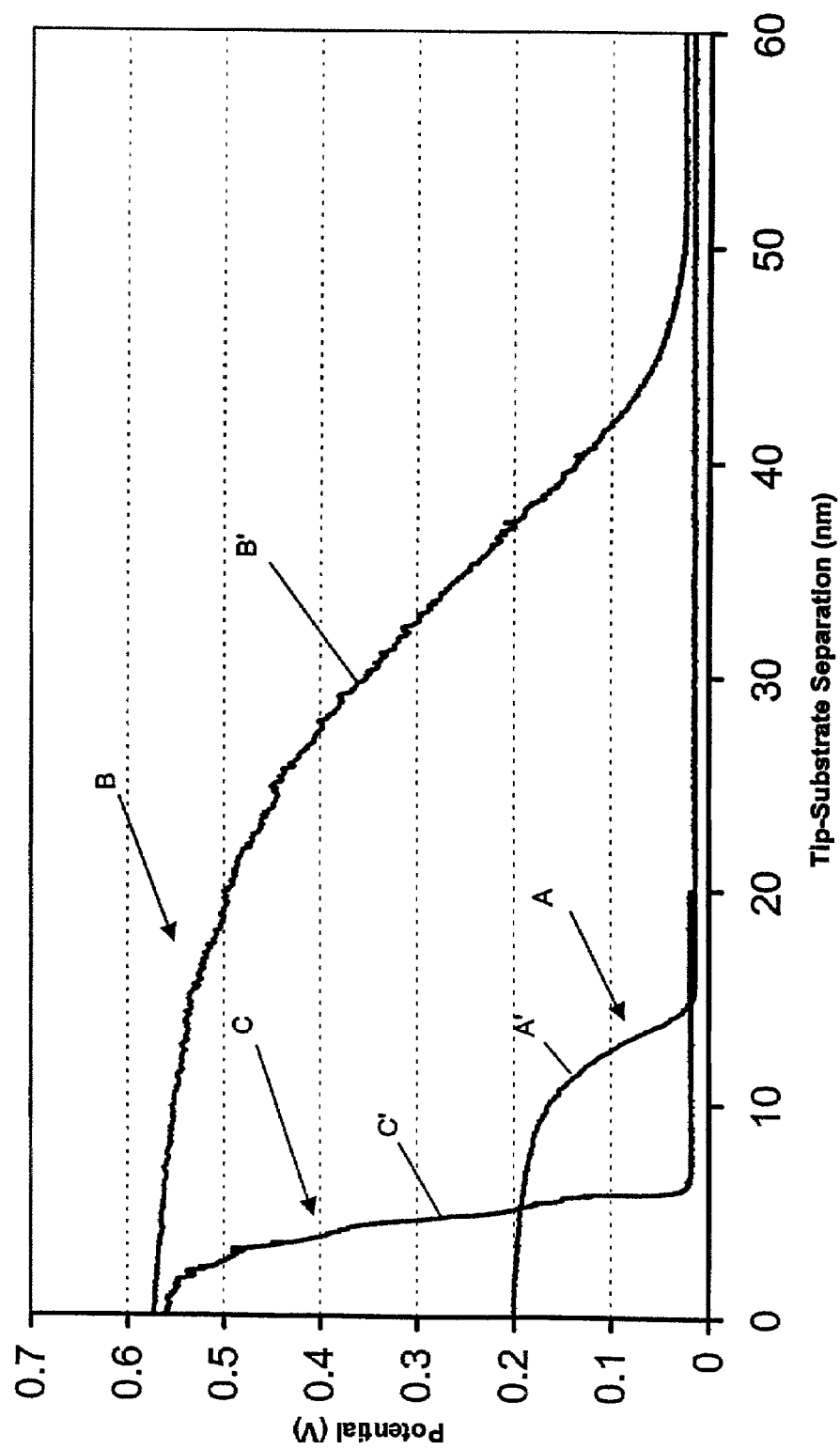
FIG. 5 is a plot of different operating points of the SEPM of the present invention, illustrating ranges of tip-sample working distances.

For an example of how ionic concentration and sample potential may be modified to optimize SEPM surface characterization of particular samples, reference is made to the operating curves shown in FIG. 5, which define the working range of the SEPM for different combinations of tuning parameters. Notably, each of curves A, B, and C in FIG. 5 are generated by fixing the X-Y coordinates of tip 56 (for example of SEPM 50), relatively constant, and then actuating tip 56 towards the substrate surface 64 and measuring the voltage between tip 56 and substrate 58 as the tip is brought into contact with the substrate. Data is collected and plotted to generate the potential versus tip-sample separation curves shown in FIG. 5. Note that the lower end of the operating range for each case shown in FIG. 5 is a tip-sample separation equal to zero. In other words, only the upper end of the operating range is tuned.

Referring initially to plot "A," the working range of SEPM 80 is illustrated for the condition in which potentiostat 82 is used to apply a potential of about 200 millivolts to sample 58 in a fluid bath 62 comprising nanopure water. For a tip-sample separation less than approximately eight nanometers (nm), potentiometer 66 detects a potential equal to about 200 millivolts, and this at least in part defines the lower end of the operating range of the SEPM 80. Notably, when considering FIG. 5, the resolution of the SEPM is dependent on primarily two factors, tip-sample separation and the slope of the corresponding operating curve. More particularly, resolution is typically improved as tip-sample separation approaches zero, even though the operating curve is often flat at these small separations. In the sloping region of plot "A" denoted "A'," the sensitivity of SEPM 80 is highlighted. In particular, in the range between about 8 nm and 15 nm, small changes in tip-sample separation result in relatively large changes in the measured potential across the double layer. And at separations greater than about 15 nm, SEPM 80 does not operate at all, and thus plot A defines an SEPM working or operating range between about 0–15 nm. Such a working range is adapted for imaging samples less than or equal to about 12 nm.

In plot "B," the sample is placed in nanopure water as was the case with plot "A," however, in this case, the potential applied to sample 58 by potentiostat 82 is increased to 600 millivolts. This increase in potential applied to substrate 58 yields an operating curve defining a much larger working range. In particular, with these conditions, SEPM 80 can operate over a range of tip-sample separations from zero nanometers to about 45 nm, as illustrated by the central sloped portion "B'" of curve B. Such an operating range is particularly desirable for samples that are delicate or poorly conducting, such as biological samples, because operation can be maintained at large tip-sample separations. However, the shallow slope of region B' illustrates that the sensitivity of SEPM 80 for these conditions may be compromised, thus indicating that image resolution may be non-optimum. Nevertheless, in those cases in which sample integrity must be maintained, for example, operating curve B may be the only choice. In any event, as noted previously, image resolution is dependent not only on the slope of the corresponding operating curve, but on the actual tip-sample separation as well. Generally, tuning the curve to define the working range as shown in plot B would be particularly desirable for samples having a thickness equal to or less than 40 nm.

Figure 6:
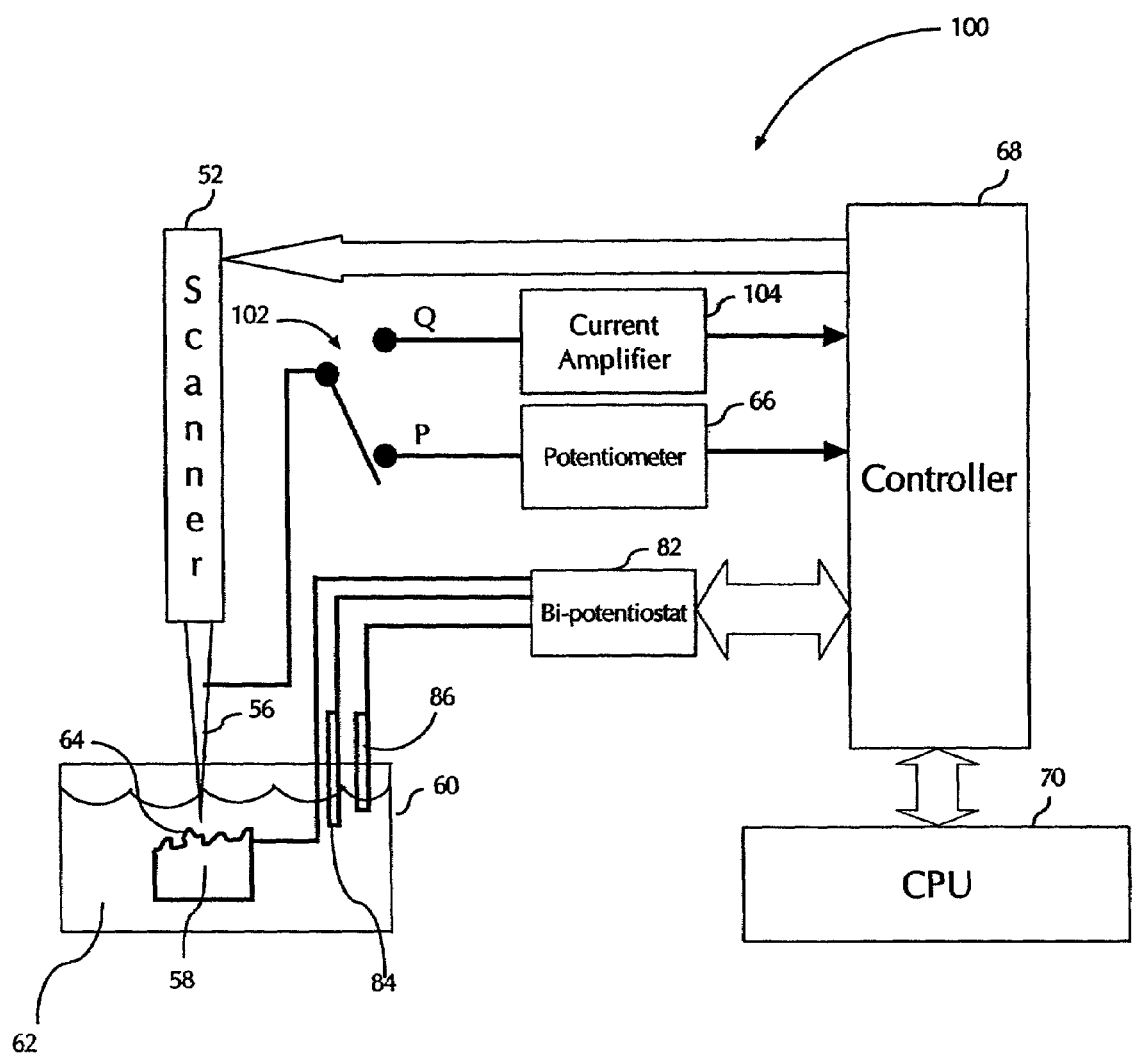
FIG. 6 is a schematic diagram illustrating a scanning probe microscope according to a preferred embodiment, configured to operate in either SEPM mode and/or STM mode.

Finally, turning to plot "C," the potential of sample 58 is maintained at the level associated with operating curve B, however, in this case, the ionic concentration of the solution is increased by using 0.1 molar (M) of $K_4Fe(CN)_6$. Now, the working range is relatively narrow extending from about zero nanometers to about 6 nm of tip-sample separation. The sensitivity of the SEPM in this case is significantly improved over the cases illustrated by plots A and B. This sensitivity is illustrated by the steep slope in the region marked "C"' of the operating plot C. For small variations in tip-sample separation, significant changes in potential are measured by potentiometer 66. This allows SEPM 80 to detect highly localized charge variations along the double layer, variations indicative of localized sample characteristics. Overall, plot C is particularly useful for characterizing non-biological samples, where the risk of sample damage is low and high sensitivity is required. Next, in FIG. 6, an integrated SPM system 100 according to the preferred embodiment combines SEPM 80, with a scanning tunneling microscope (STM) and/or an atomic force microscope (AFM). More particularly, SPM 100 includes a scanner 52 for scanning a tip 56 of a probe 54 over a surface 64 of a sample 58, as in the previous embodiments. In addition, a potentiostat 82 comprising a three-electrode configuration is included to selectively control the potential of sample 58 and tune SEPM operation. Note that potentiostat 82 is preferably a bi-potentiostat that is operable in either potentiostatic or galvanostatic (i.e, controlling current flow though the substrate) mode to tune SEPM operation in the way the user wants the electrochemical processes to occur. In potentiostatic mode, the potential applied to the substrate is selected based on what type of reaction the user wants to observe. In galvanostatic mode, the bi-potentiostat controls how fast the electrochemical reaction(s) occurs. Overall, poteniostatic mode is preferred as it allows more control in tuning the working curve by controlling the potential in the system.

SPM 100 also includes a potentiometer 66 for interfacing with a controller 68 in SEPM mode. Similar to previous embodiments, controller 68 is coupled to a computer 70 for, among other things, data acquisition, storage and manipulation.

Further, SPM 100 includes a switch 102 capable of toggling between a first position labeled "P" for operation as a scanning electrochemical potential microscope (SEPM) to acquire, for example, a voltage profile associated with the sample, and a second position labeled "Q," which couples probe 54, and particularly, tip 56 to a current amplifier 104 for operation as a scanning tunneling microscope. When switch 102 is placed in the "P" position, probe 54 acts as a potential probe measuring voltages at tip 56, and when switch 102 is placed in position "Q," probe 54 can generate a tunneling current through tip 56 to operate as an STM. Switch 102 may be either a mechanical switch or an electrical switch, as is conventional.

Notably, when operated as an SEPM, bi-potentiostat 82 of SPM 100 can be disconnected for operation in open circuit condition, as in FIG. 2. In this case, a potential remains at surface 64 of sample 58 defined by the double layer that is developed by the ions in the polar liquid aligning at the surface of the sample. This open circuit operation essentially simulates a battery like effect where the potential can change at each point on the sample surface based on the selected sample to be measured. The potential measured across the double layer in this case may be relatively small, depending on the type of sample and solution, but may be required for some samples, as described previously in conjunction with FIG. 5 for a similar set of parameters.

Next, the same tip 56 can be used for operation in either SEPM mode or STM mode, thus allowing SPM system 100 to image a particular region of the sample, and re-scan that region without changing the tip. An example of such operation will be described below in conjunction with FIGS. 7A–7D.

Alternatively, rather than SEPM and STM modes, integrated SPM 100 can be a combination of an SEPM (switch 102 set to "P"), and an AFM (switch 102 set to "Q"), with probe 54 being replaced with a cantilevered probe (not shown), and current amplifier 104 replaced with a feedback loop including a deflection detection system. In this case, a conducting AFM tip must be employed, or the tip (e.g., silicon or silicon nitride) can be made conducting by, for example, doping or metallization.

Whether integrated SPM 100 is a combination of SEPM and AFM or STM, a first image may be obtained by scanning in AFM or STM mode, for example, to generate a topography map of at least a part of the sample surface 64. Then, SPM 100 can re-scan the just-scanned region of the sample to obtain an SEPM image, as described in further detail below. In each of these cases, computer 70 acquires and stores data (e.g., the feedback signals) so as to map the topography of the surface, the potential distribution over the surface, etc.

Figure 7A:
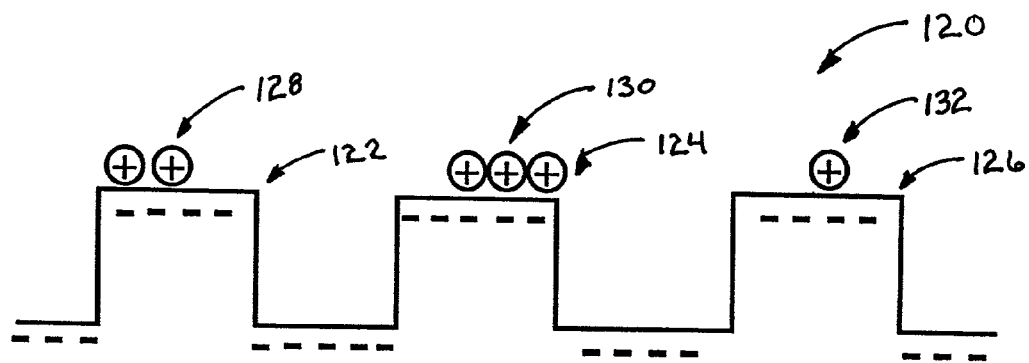
FIG. 7A is schematic side elevational view of a sample, illustrating the electrical double layer.
Figure 7B:
FIG. 7B is a schematic view illustrating the SEPM voltage profile obtained by characterizing the sample of FIG. 7A using the SEPM of the preferred embodiment.

An illustration of this operation of SPM 100 is shown in FIGS. 7A–7D. In FIG. 7A, an illustrative sample 120 is characterized as having local variations in topographical features 122, 124, 126, as well as local variations in charge distribution 128, 130, 132. When imaging sample 120 of FIG. 7A with SPM system 100 in SEPM mode (switch 102 at "P" in FIG. 6), and more particularly in constant potential mode of SEPM operation (methods discussed below), an SEPM profile 134, as shown in FIG. 7B, can be obtained. Notably, in FIG. 7B, both topographical features 122, 124, 126 of sample 120 as well as the local variations in charge 128, 130, 132, are mapped.

Figure 7C:
FIG. 7C is a schematic view illustrating the topography of the sample of FIG. 7A, using the SEPM of the preferred embodiment in STM mode.
Figure 7D:
FIG. 7D is a schematic view illustrating the differential between the data plotted in FIGS. 7B and 7C, i.e., the charge distribution associated with the sample of FIG. 7A.

Next, turning to FIG. 7C, by scanning sample 120 in either STM or AFM mode (switch 102 set at "Q" in FIG. 6), topographical features of sample 120, independent of local variations in charge distribution, are detected so as to generate topography image 134. Then, to obtain a measure of the charge distribution at the surface of sample 120, the topographical image 136 shown in FIG. 7C is subtracted from SEPM image 134 of FIG. 7B to obtain a plot 138 corresponding to the surface charge distribution of sample 120. FIG. 7D illustrates the surface charge distribution map 138. Notably, in this regard, charge distribution is also known as the differential measurement.

Overall, similar to an STM image that contains information regarding both surface geometry and electron density, an SEPM image is a mix of geometric information and charge distribution. Possible causes of local charge variation include the potential applied to the substrate, the chemical composition of the substrate, the geometry of the surface, the chemical species and their concentrations in the solution, and the samples themselves, e.g., biological materials.

Again, each of the aforementioned images can be obtained over the very same location with both the SEPM and the STM/AFM with no change in SPM components because sharp probe 54 can be used in both SEPM and STM/AFM imaging modes.

Figure 8:
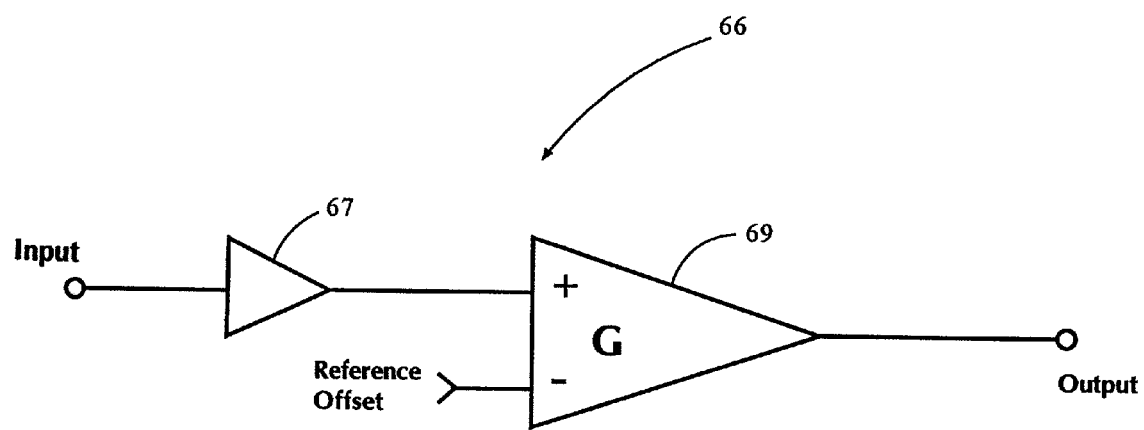
FIG. 8 is a schematic circuit diagram illustrating a potentiometer according to the preferred embodiment.

Turning next to FIG. 8, potentiometer 66 is shown in further detail. In order to achieve molecular and even atomic resolution, potentiometer 66 is specifically configured to increase the gain of the measured voltage, yet reduce the corresponding noise level. To accomplish these performance characteristics, potentiometer 66 includes a buffer amplifier 67 coupling the input from probe 54 to an amplifier 69 for magnifying the SEPM signal. Preferably, amplifier 69 operates as an offset subtraction and gain stage where the output of buffer 67 is subtracted from the reference offset (e.g., from the reference electrode 84 of potentiostat 82, if employed), and a gain, G, is applied. The magnitude of the SEPM potential signal is then determined. Notably, reference electrode 84 could be the sample itself and, in that case, a potential difference is measured. Preferably, amplifier 69 is an instrumentation amplifier and buffer 67 is a high impedance follower, each as conventional in the art.

Figure 9:
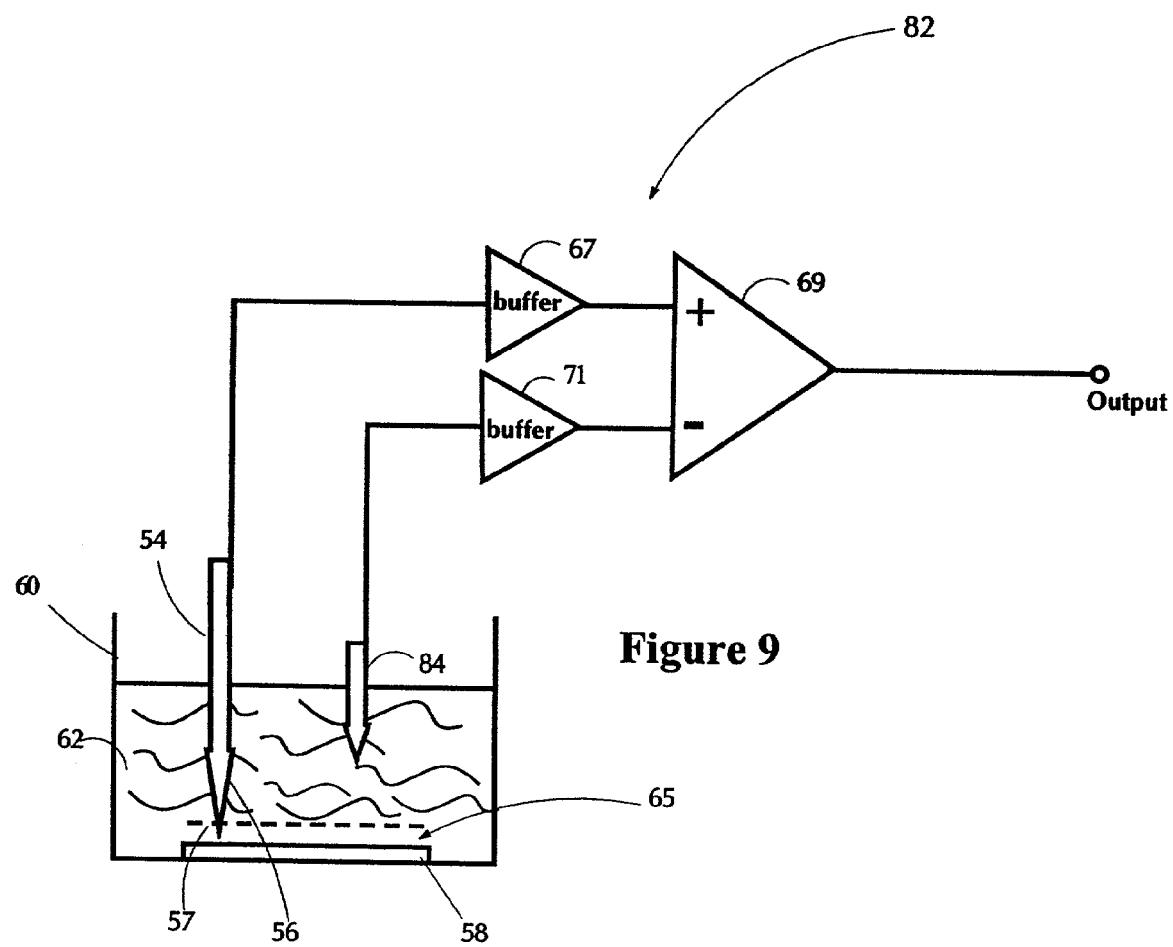
FIG. 9 is a partially broken away schematic diagram of a potentiometer coupled to an SEPM probe placed in a fluid bath containing a sample.

In FIG. 9, a schematic of potentiometer 66 used as shown in the preferred embodiment (for example, SEPM 100 in FIG. 6) shows how working probe 54, and particularly an apex 57 of tip 56 of probe 54, is scanned by actuator 52 (FIG. 4). For SEPM operation, tip 56 interfaces a double layer 65 formed at surface 64 of sample 58, and is electrically coupled to the input of buffer 67 which has an output coupled to the positive terminal of amplifier 69. Reference probe 84 of potentiometer 66 (FIG. 4) is electrically coupled to the negative terminal of amplifier 69, preferably via another high impedance buffer amplifier 71. Note that although working probe 54 must be placed in the double layer to measure local variations in charge at the sample surface 64, reference electrode 84 is disposed in solution 62 outside the double layer, or the electrode 84 could be the sample itself. In this latter case, the potential difference between tip 56 and sample 58 is detected. The output of amplifier 69 of potentiometer 66, as mentioned previously, is coupled to controller 68, while computer 70 operates to acquire data from controller 68 to map, for example, the potential of the sample surface during a scanning operation.

SEPM 80, or SPM 100 operating in SEPM mode, can function in three separate modes generally directed to measuring particular characteristics of a sample with molecular/atomic level resolution. In each SEPM mode, the potential across the electrical double layer formed at the sample surface is monitored so as to provide an indication of the sample characteristic to be measured. Again, this is facilitated by the charges in the double layer at the sample surface aligning and following the sample surface. Each of these modes is described below in conjunction with the flow charts shown in FIGS. 10A–10C. In the first mode, illustrated in FIG. 10A, which is referred to hereinafter as constant potential mode (CPM), method 200 can be used to image surface characteristics including topography of sample 58.

In CPM, depending upon imaging parameters, a constant potential between tip 56 and sample 58 is maintained by operating a feedback loop implemented via controller 68 that monitors the potential of tip 56 using potentiometer 66 and adjusts the tip-sample separation to maintain constant separation. As a result, SEPM 80 maintains the potential at the constant, preset value while scanning the tip relative to the substrate. This set-point potential corresponds to a particular tip-sample separation (i.e., perpendicular distance between the probe tip and the sample surface where the perpendicular distance is preferably the shortest distance between the tip and sample) which is maintained while imaging by monitoring the surface charge (formed by the electrical double layer for an ionic solution, and an electrical double layer-like ordering of the surface charge in a non-ionic polar solution such as nanopure water). Again, the surface charge tracks and is ordered a particular distance above the sample surface. By collecting data with computer 70, a surface characterization map can be generated. Notably, the potential variation in an SEPM map generated in CPM may be indicative of either the topographic variation of the sample surface or a change in the charge distribution near the surface. For an example in this regard, see the above discussion regarding FIGS. 7A–7D pertaining to difference measurements.

More particularly, CPM method 200 includes a start-up and initialization Step 202 after which the user selects an SEPM set-point potential in Step 204. Next, the SEPM brings the tip into contact with the electrical double layer formed at the sample surface in Step 206. In Step 208, the SEPM begins scanning the sample surface. And, in Step 210, method 200 determines if the scan is complete (e.g., determines whether a particular portion of the sample surface has been raster scanned).

If the scan is not complete, the SEPM process 200 measures and records the potential at that scan location in Step 212, and then determines, via a feedback loop in Step 214, whether the set-point potential is being maintained by comparing the measured potential with the set-point potential. If not, in Step 216, a feedback signal is generated to adjust tip/sample separation via the feedback loop to reestablish the tip-sample separation that maintains the set-point potential. In addition, the data based on the feedback signal is collected for that X-Y scan position of the sample in Step 218, and the collected data is then plotted to generate a surface characteristic map of the sample in Step 220. Notably, this data is preferably displayed in real time so the user can continuously monitor the surface characteristics image as it is being generated. Then, the process is returned to Step 210 to determine if the scan is complete.

On the other hand, if the set-point potential is being maintained at that scan location, tip/sample separation is not adjusted and data is collected for that location in Step 218. Again, the data is plotted in Step 220 and method 200 is returned to Step 210 to determine whether the scan is complete. When process 200 determines that the scan is complete, the operation is terminated in Step 222.

Notably, using the SEPM to generate a surface characteristic image overcomes the drawback of using STM where image interference due to ionic current generated by the polar liquid is present, especially in concentrated solutions. Moreover, in this regard, tip 56 is more stable in SEPM mode than in STM mode when working in solution. Again, this is due to SEPM not requiring a current flow between the tip and sample. And, because there is no electrochemical reaction required for imaging, the SEPM works at both redox potentials and at all other potentials, contrary to SECM.

Figure 10B:
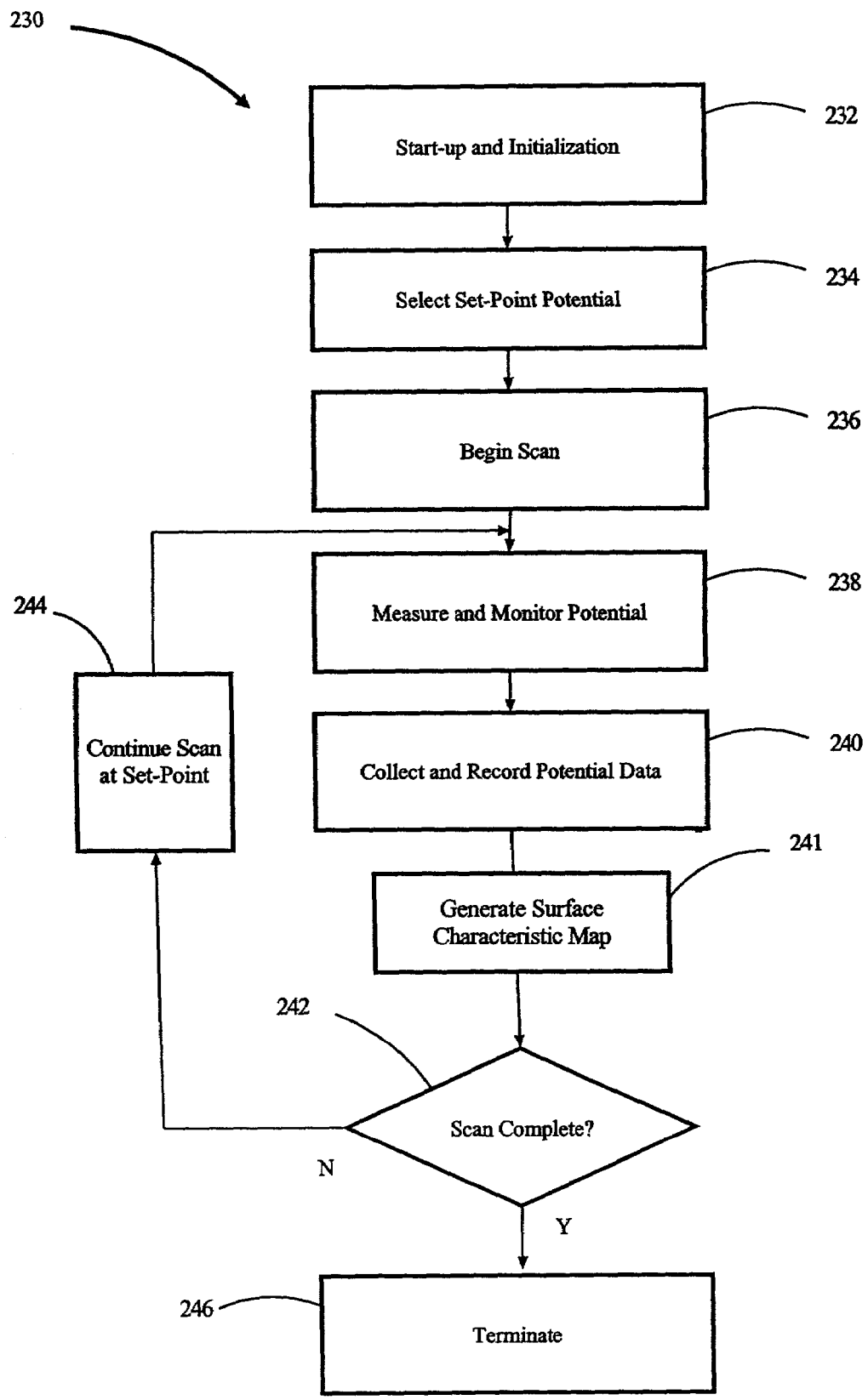

In the second mode of SEPM operation, referred to hereinafter as constant height mode (CHM) and illustrated with the method 230 shown in FIG. 10B, potential mapping is provided. In this case, probe 54 is not moved in the vertical or Z direction at all while scanning probe 54 relative to sample 58. In CHM, potential distribution over surface 64 of sample 58 can be mapped by monitoring the voltage measured by potentiometer 66.

The CHM method 230 of the preferred embodiment initially includes a start-up and initialization Step 232 after which the user selects a set-point potential (e.g., 200 mv) defining an absolute height of the tip, i.e., the position of the tip (or the sample) is not changed in Step 234. The potential is selected based on the user's particular requirements including the tip/sample properties and the environmental conditions in which the sample is being imaged, including, for example, the ionic concentration of the electrolytic solution, if used. Next, in Step 236, the SEPM instigates relative scanning motion between the tip and sample surface.

While scanning a first point in Step 236, the SEPM method monitors the potential of the tip in Step 238 using the potentiometer, and then stores the corresponding potential data for that scan position in Step 240. Then, in Step 241, the stored data is plotted so that it may be observed real-time by the user. Method 230 next determines whether the scan is complete in Step 242 and, once it is, method 230 terminates the operation in Step 246. Until then, however, scanning is continued via Step 244, and surface characterization data is plotted in Step 241 for the user to observe real-time. Again, in CHM, tip height is maintained constant as set in Step 234, such that the map illustrates varying potential directed to, for example, local charge variations.

Finally, in the third mode, known as the spectroscopic mode, a potential-distance profile is generated. In spectroscopy mode, by measuring the potential while varying the tip-substrate separation to translate tip 56 towards sample surface 64 in FIG. 6, the potential profile across the double layer can be obtained. Tip-substrate separation is preferably varied by actuating the actuator 52, where actuator 52 includes a Z actuator. In this mode, the X-Y position of the tip relative to the sample is kept constant, as no scanning motion is employed. Such measurements are illustrated in FIG. 5, described above in connection with examples of different combinations of tuning parameters.

Figure 10C:
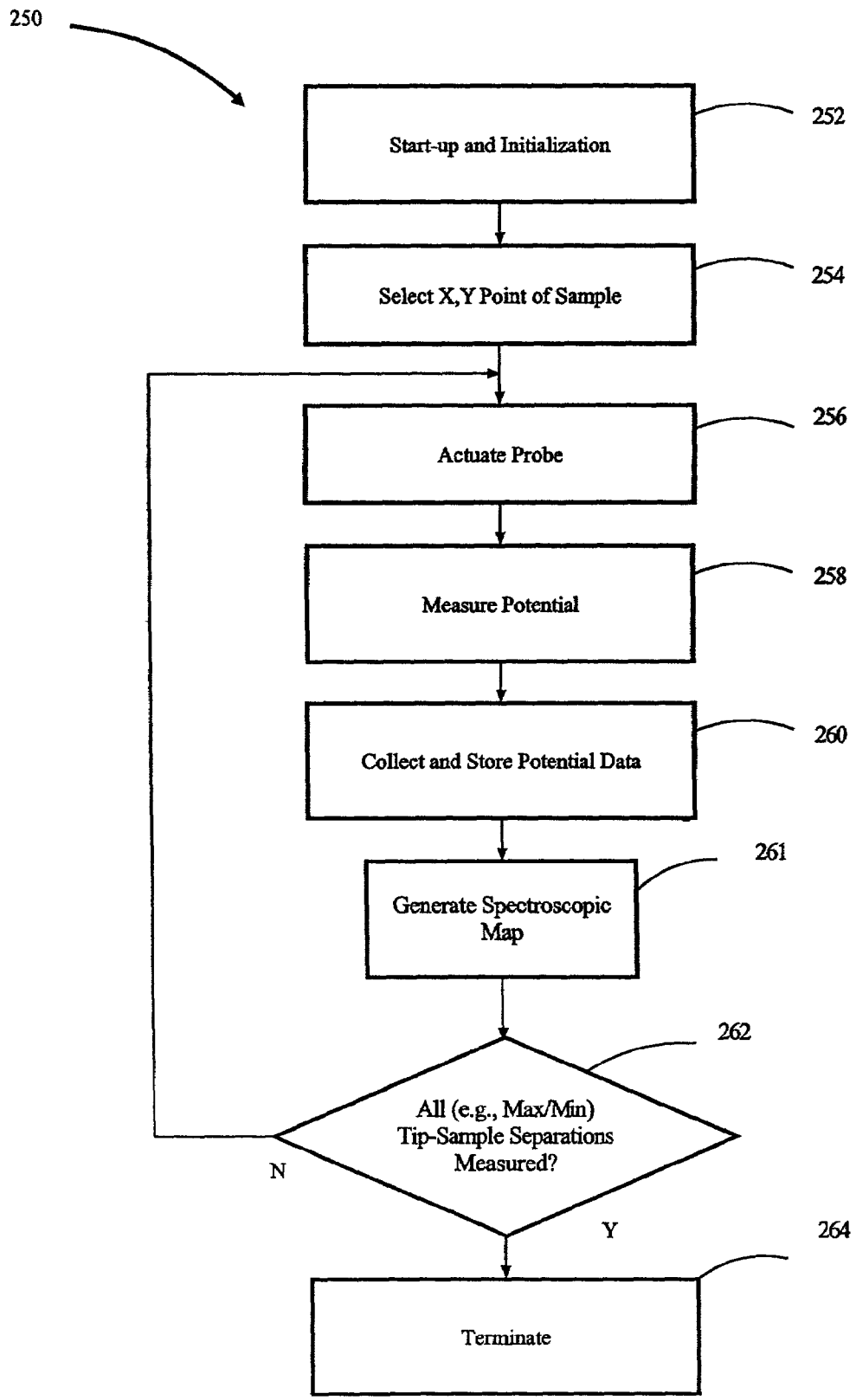

In particular, turning to FIG. 10C, a spectroscopic method 250 includes a start-up an initialization Step 252 where an initial tip/sample set-point is maintained. Then, in Step 254 the user selects a particular location on the sample surface to obtain a measurement having coordinates (X, Y). Then in Step 256 the tip of the probe is actuated towards the sample surface (either to a selected location or continuously) while the system simultaneously detects the potential between the tip and sample across the electrical double layer in Step 258. In Step 260, the potential data is collected and stored for that tip-sample separation. This data is thereafter plotted for that tip-sample separation for real time observation by the user in Step 261.

In Step 262, the method 250 determines whether all desired tip-sample separations have been measured. If not, method 250 returns operation back to Step 256 to repeat the actuation, detect, store and plot steps for another tip/sample separation. The process continues to collect a number of different potential measurements at each of, for example, a continuous number of tip/sample separations, which again can be observed after being plotted via Step 261. Once all data is collected, the operation is terminated in Step 264.

Of course, in addition to the above imaging possibilities, the SEPM can be combined with STM and/or AFM to combine the advantages of each device, and offer side-by-side comparison of the STM and/or AFM image with the SEPM image over the identical surface.

Figure 11:
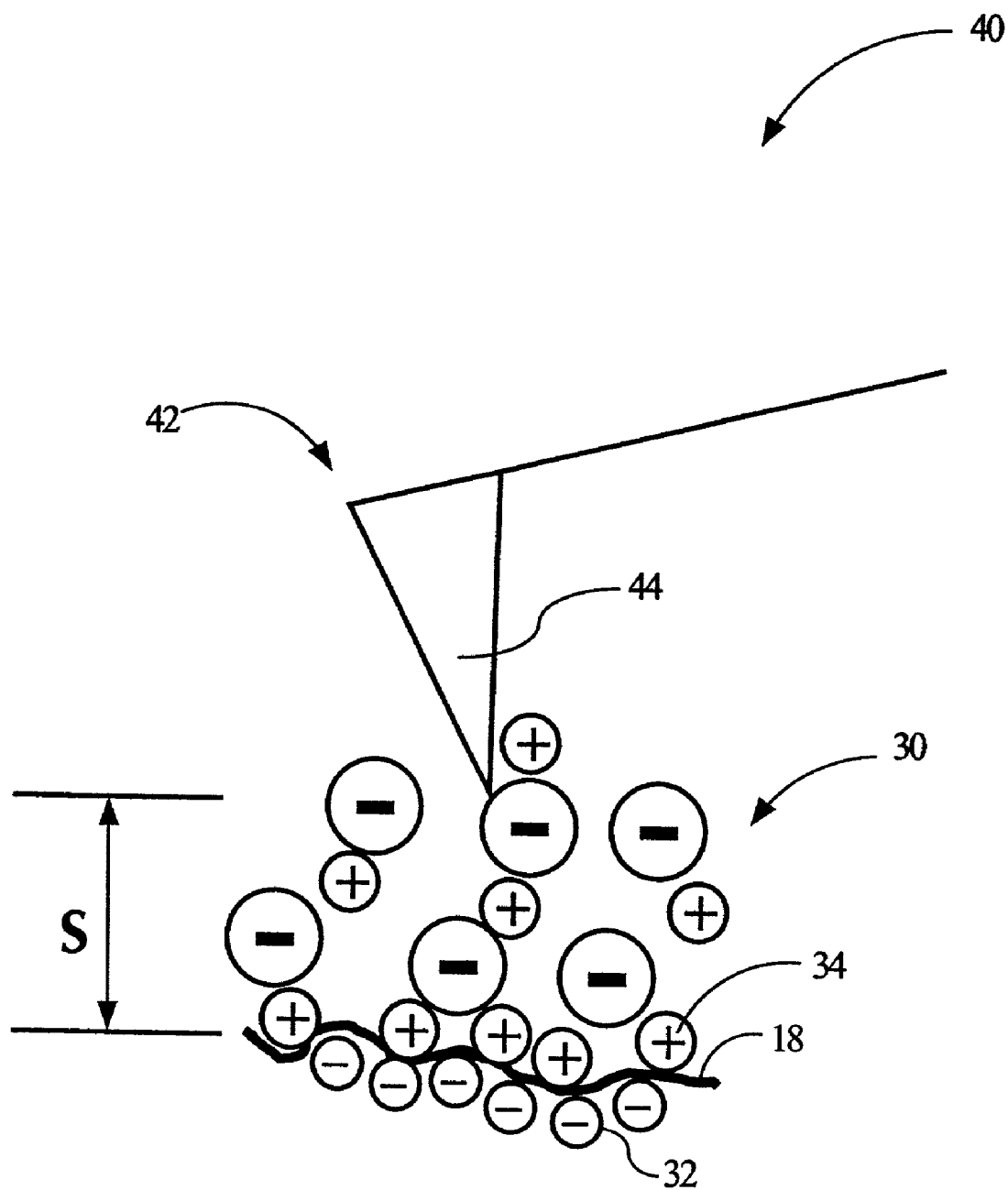
FIG. 11 is a partially broken away front elevational view illustrating an AFM probe disposed in an electrical double layer formed at a sample surface immersed in an ionic solution.

An illustration of using a typical atomic force microscope to probe an electrical double layer is shown in FIG. 11. FIG. 11 is a cross-section of a tip and a substrate for a typical AFM used in solution, where "S" denotes the separation between the force-sensing tip and substrate 18. Of course, this system can be used to explore the double layer via detecting the force exerted by the ions in double layer. With reference to FIGS. 7A–7D in the above discussion, a subtraction of the two images obtained by an SPM (100 in FIG. 6, for example) in SEPM mode and in AFM mode can give the user an indication of charge distribution (FIG. 7D).

Figure 12A:
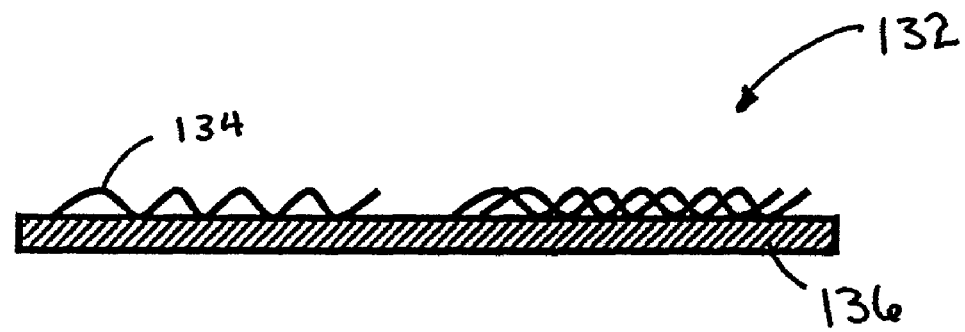
FIG. 12A is a schematic side elevational view of a sample comprising single strand DNA, before and after hybridization.
Figure 12B:
FIG. 12B is a plot illustrating the SEPM voltage profile obtained by scanning the sample shown in FIG. 12A.

Some practical applications for SEPM measurements are shown in FIGS. 12A and 12B, 13A and 13B, and 14A and 14B. In FIG. 12A, a sample 132 comprising single strand DNA 134, is placed on a substrate 136. On the left-hand side, DNA 134 is non-hybridized, while on the right-hand side the DNA 134 is shown after hybridization. When employing SEPM 80, or SEPM mode of SPM 100, the SEPM profile shown in FIG. 12B is generated. In this case, the magnitude of the SEPM profile, i.e., the measured potential, changes (for example, an amount "X") when comparing the image of the hybridized DNA to the single strand, non-hybridized DNA. As a result, the SEPM profile allows a user to locate where on a particular sample the DNA has hybridized without using, for example, a gene chip having the aforementioned attendant drawbacks (labor-intensive sample preparation, etc.). Again, with the knowledge of the location of particular DNA strands on a sample, the identity of an unknown strand of DNA can be discovered, for example, by noting the location of the SEPM map at which the DNA hybridized.

Figure 13A:
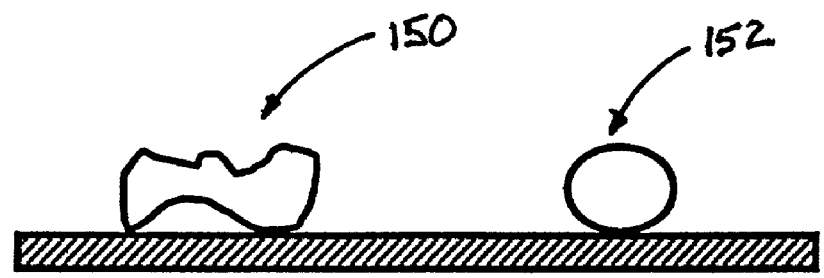
FIG. 13A is a schematic side elevational view of a sample comprising two different types of proteins.
Figure 13B:
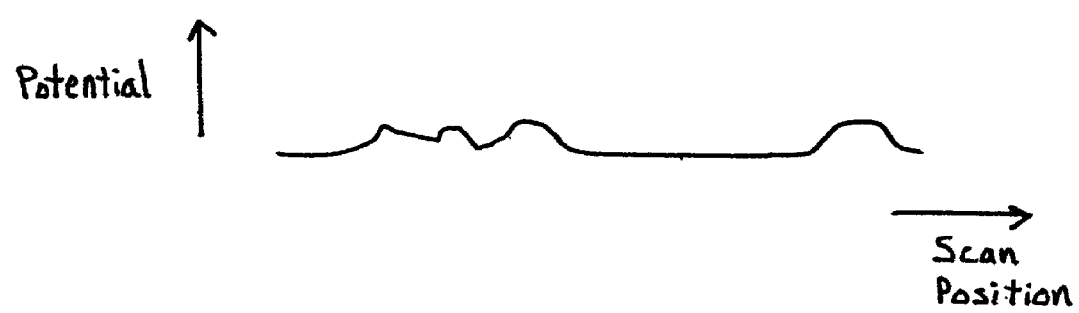
FIG. 13B is a plot illustrating the SEPM voltage profile obtained by scanning the sample shown in FIG. 13A.
Figure 14A:
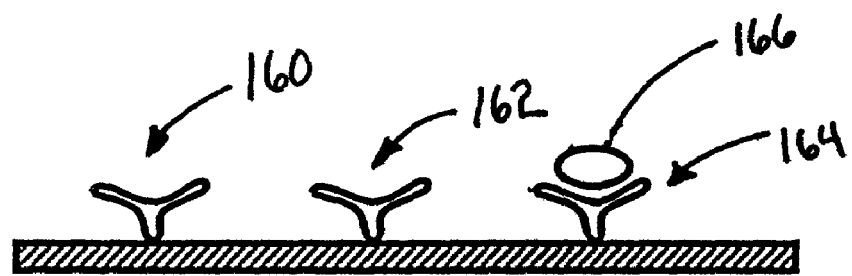
FIG. 14A is a schematic side elevational view of a sample comprising antibodies, one of which has combined with an antigen.
Figure 14B:
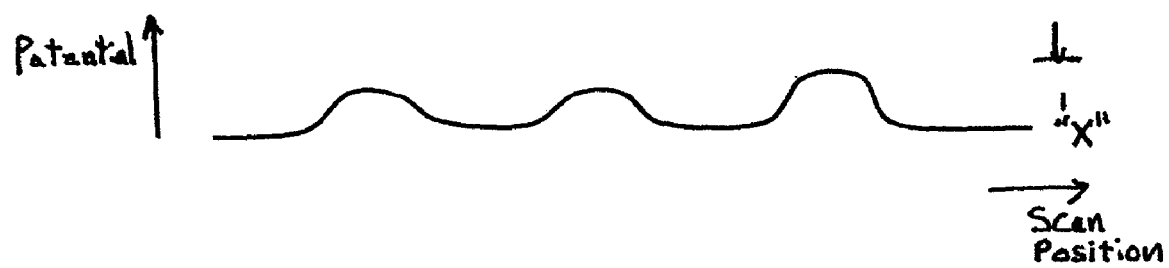
FIG. 14B is a plot illustrating the SEPM voltage profile obtained by scanning the sample shown in FIG. 14A.

Next, in FIG. 13A, two examples of proteins 150, 152 are shown. When generating the SEPM profile in constant potential mode, the topographical changes measured thereby give an indication as to the shape of the protein. As is appreciated in the art, the shape of the protein is important to researchers to identify the type of protein being observed. This SEPM profile is shown in FIG. 13B, where the scan position corresponds to the location of the proteins. In yet another example, a series of antibodies 160, 162, 164 are shown in FIG. 14A, including one of the antibodies 164 having combined with an antigen 166. In this case, when imaging in constant height mode, a potential map of the surface of the antibody/antigen samples can be obtained. As can be seen in FIG. 14B, where the scan position corresponds to the location of the antibodies, for the case in which the antigen is combined with the antibody, the measured potential changes (for example, an amount "X"), which is what is expected due to the charge change incurred by the combination.

Figures 15A, 15B:
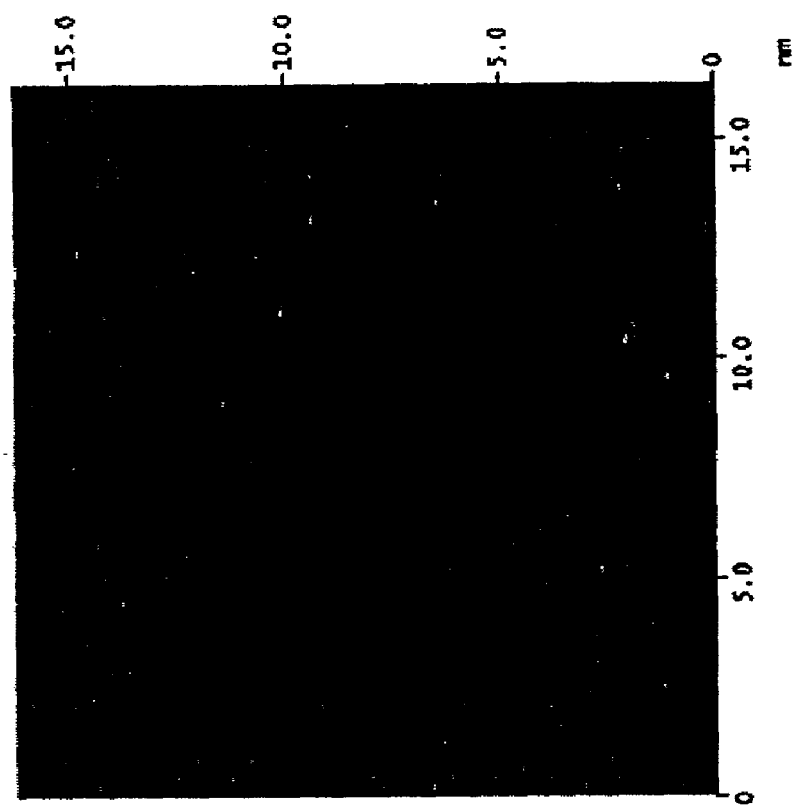
FIGS. 15A and 15B are photos illustrating charge and topography maps generated by an SEPM according to the preferred embodiment.

Two photos of exemplary SEPM images are shown in FIGS. 15A and 15B. In FIG. 15A, a combination of topographical and surface charge features can be noted (discussed previously in conjunction with the illustration in FIG. 7B). In FIG. 15B, an SEPM image is shown where the SEPM is used to achieve atomic resolution, with each "dot" representing one atom. FIG. 15A defines a larger scan size, i.e., lower magnification.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

What is claimed is:

1. A scanning electrochemical potential microscope (SEPM) comprising:
 a polar solution;
 a sample support that accommodates a sample immersed in the polar solution, wherein a potential gradient is formed at a surface of the sample by an electrical double layer;
 a probe having a tip including a distal end disposed a perpendicular distance from the surface in the electrical double layer; and
 a potential measuring device electrically coupled to said tip that measures a potential across said potential gradient.

2. The SEPM of claim 1, further comprising a scanning actuator that provides relative scanning movement between said probe and said sample.

3. The SEPM of claim 1, wherein said scanning actuator is a piezoelectric actuator.

4. The SEPM of claim 1, further comprising a feedback circuit that generates a feedback signal based on said potential.

5. The SEPM of claim 4, further comprising a Z-actuator that translates the Z-position of said tip in response to said feedback signal.

6. The SEPM of claim 1, further comprising a Z-actuator that translates the Z-position of the tip in a spectroscopic mode.

7. The SEPM of claim 1, further comprising a tuning device that modifies a sample potential at the sample surface.

8. The SEPM of claim 7, wherein said tuning device is a bi-potentiostat.

9. The SEPM of claim 1, wherein the polar solution has an associated ionic concentration.

10. The SEPM of claim 9, wherein said ionic concentration can be modified to tune the operation of the SEPM.

11. The SEPM of claim 1, wherein said polar solution is a selected species that has a selected ionic concentration.

12. A scanning electrochemical potential microscope (SEPM) comprising:
 a sample support that accommodates a sample immersed in polar solution, wherein a potential gradient is formed at a surface of the sample;
 a probe having a tip including a distal end disposed a perpendicular distance from the surface;
 a potential measuring device electrically coupled to said tip that measures a potential across said potential gradient; and
 wherein the polar solution has an associated ionic concentration, and said potential gradient is formed by an electrical double layer, and said tip is positioned in the electrical double layer.

13. The SEPM of claim 12, further comprising a tuning device that modifies a sample potential at the sample surface.

14. The SEPM of claim 13, wherein said tuning device is a bi-potentiostat.

15. The SEPM of claim 12, wherein said ionic concentration can be modified to tune the operation of the SEPM.

16. The SEPM of claim 12, wherein the polar solution is a selected species that has a selected ionic concentration.

* * * * *